(12) United States Patent
Greene

(10) Patent No.: US 6,349,822 B1
(45) Date of Patent: Feb. 26, 2002

(54) COMPACT DISK HOLDER WITH LABELS

(76) Inventor: Hal Jay Greene, 293 Whitford, Nutley, NJ (US) 07110

( * ) Notice: Subject to any disclaimer, the term of this patent is extended or adjusted under 35 U.S.C. 154(b) by 0 days.

(21) Appl. No.: 09/475,313

(22) Filed: Dec. 30, 1999

Related U.S. Application Data

(60) Provisional application No. 60/114,184, filed on Dec. 30, 1998.

(51) Int. Cl.$^7$ ................................................ B65D 85/57
(52) U.S. Cl. ...................... 206/308.1; 206/312; 206/313
(58) Field of Search ............................... 206/308.1, 309, 206/311, 312, 313

(56) References Cited

U.S. PATENT DOCUMENTS

| | | | | |
|---|---|---|---|---|
| 4,850,731 A | * | 7/1989 | Youngs | 402/79 |
| 4,899,879 A | * | 2/1990 | Rosen | 206/445 |
| 5,270,101 A | * | 12/1993 | Helicher | 428/209 |
| 5,462,160 A | * | 10/1995 | Youngs | 206/312 |
| 5,588,527 A | * | 12/1996 | Youngs | 206/308.1 |
| 5,595,293 A | * | 1/1997 | Miller | 206/308.1 |
| 5,657,867 A | * | 8/1997 | Fu et al. | 206/308.1 |
| 5,685,424 A | * | 11/1997 | Rozek et al. | 206/308.1 |

* cited by examiner

*Primary Examiner*—David T. Fidei
(74) *Attorney, Agent, or Firm*—Brown Raysman Millstein Felder & Steiner LLP

(57) ABSTRACT

A holder for compact disks is disclosed which retains labels and other printed materials. The holder includes a plurality of layers bonded together to form multiple sheaths, with at least one media sheath for holding a compact disk, and at least one information sheath for retaining the printed materials. The holder presents a customizable and readily-replaceable label in an easy-to-view orientation in the stack of holder/CDs. The holder does not have hinged or moving mechanical parts, and so is capable of retaining multiple CDs without mechanical wear and breakage. Cushioning and other protective characteristics are provided to avoid damage and the adverse affects of dust. The holder may be of sufficient size or greater than the size of standard CD jewel boxes or jewel cases to store, preserve, and display the original printed materials provided with the CD without alteration or multilation of such printed material.

5 Claims, 2 Drawing Sheets

COMPACT DISK HOLDER WITH LABELS

This application claims benefit of Provisional No. 60/114,184 filed Nov. 30, 1998.

BACKGROUND OF THE INVENTION

The present invention relates to containers, and more particularly, to a holder for retaining media such as compact disks.

Holders and other storage containers are known for retaining media such as computer floppy disks as well as compact disks for music and for CD-ROMs. Typically, such holders may be shelved and otherwise themselves stored in stacks. In such shelved or stacked arrangements, the information-bearing indicia or printed materials on the media may be obscured, and so holders of media are known to also include such information-bearing indicia or printed materials to facilitate location and retrieval of specific information on items of media.

For example, as described in U.S. Pat. Nos. 3,942,639; 5,101,973; and 5,396,987; media holders include slots or apertures in which are disposed labels to identify the media stored in the holders. However, the labels are typically oriented sideways or other inconvenient positions, which causes searching through such labels to be difficult. In addition, such labels are typically retained on the holder by permanent adhesive, which reduces the ability to revise such labels as desired by the user.

A need exists for a holder for CDs and the like which presents a customizable and readily-replaceable label in an easy-to-view orientation in the stack of holder/CDs.

In addition, known media holders typically include hinges or other folding elements to maximize the number of items of media which may be retained by the holder. Accordingly, even if such holders are composed of plastic, such hinges may wear and break.

A need exists for a media holder which is capable of retaining multiple CDs without moving parts to avoid wear and breakage.

Further, known media holders do not typically provide cushions and other protective elements for the media stored therein, although CDs and computer disks may indeed be damaged by scratching and friction. In addition, known media holders may not prevent the accumulation of dust, which decreases the retention and retrieval of data from CDs and computer disks.

Accordingly, a needs exists for a media holder which incorporates cushions and other protections against damage and dust.

CD holders known as jewel boxes or jewel cases are typically composed of rigid plastic having a hinged cover which may wear and break. In addition, such jewel boxes have a standard size, typically having a square cross-section with a diameter of about 5 inches (about 12.7 cm.), and substantially circumscribing the circular CD stored therein. These cases typically have a thickness of approximately one-fourth of an inch (about 0.635 cm.), making multiple storage of such cases difficult due to their bulk, especially since such fixed thicknesses in a stack of cases greatly exceeds the combined thicknesses of the CDs stored therein.

Flat replacement holders for CDs are known, such as the "VIEWPAK" commercially available from "UNIVENTURE, INC." and described in U.S. Pat. No. 4,850,731. Such flat replacement holders of "UNIVENTURE, INC." are transparent bags composed of transparent sheets of plastic having a square cross-section with a diameter of about 5 inches (about 12.7 cm.), and substantially circumscribing the circular CD stored therein, CDs are provided with artwork and liner notes which, when unfolded and laid flat for insertion into such a flat replacement holder, exceed the size of the standard jewel box as well as the size of the flat replacement holder. Therefore, when transferring these printed materials to the flat replacement holder, one must resort to cutting and truncating such artwork and liner notes, or otherwise bending and folding such printed materials in order to store these printed materials in a flat replacement holder with the CD. Thus, the information and the aesthetic appeal of such printed materials are lost or destroyed due to the difference in size when these printed materials are transferred from a standard jewel case and unfolded and laid flat for insertion into a flat replacement holder.

A need exists for a CD holder which allows for the transfer of the printed material, which has been formatted and folded in three dimensions for display in a one-fourth inch (0.635 cm.) thick jewel case, to be unfolded and stored flat into a thin flat replacement holder, without cutting and truncating such artwork and liner notes, or otherwise without bending and folding such printed materials in order to store them with the CD.

A need also exists for a CD holder which provides sufficient space for artwork, liner notes, and other printed materials having a size greater than the size and space provided by standard jewel boxes and jewel cases.

SUMMARY OF THE INVENTION

A holder for compact disks is disclosed which retains labels and other printed materials. The holder includes a plurality of layers bonded together to form multiple sheaths, with at least one media sheath for holding a compact disk, and at least one information sheath for retaining the printed materials. The holder presents a customizable and readily-replaceable label in an easy-to-view orientation in the stack of holder/CDs. The holder does not have hinged or moving mechanical parts, and so is capable of retaining multiple CDs without mechanical wear and breakage. Cushioning and other protective characteristics are provided to avoid damage and the adverse affects of dust.

In addition, the holder may be of sufficient size greater than the size of standard CD jewel boxes or jewel cases to store, preserve, and display the original printed materials provided with the CD without alteration or mutilation of such printed material.

DETAILED DESCRIPTION OF THE PREFERRED EMBODIMENT

Figure 1:
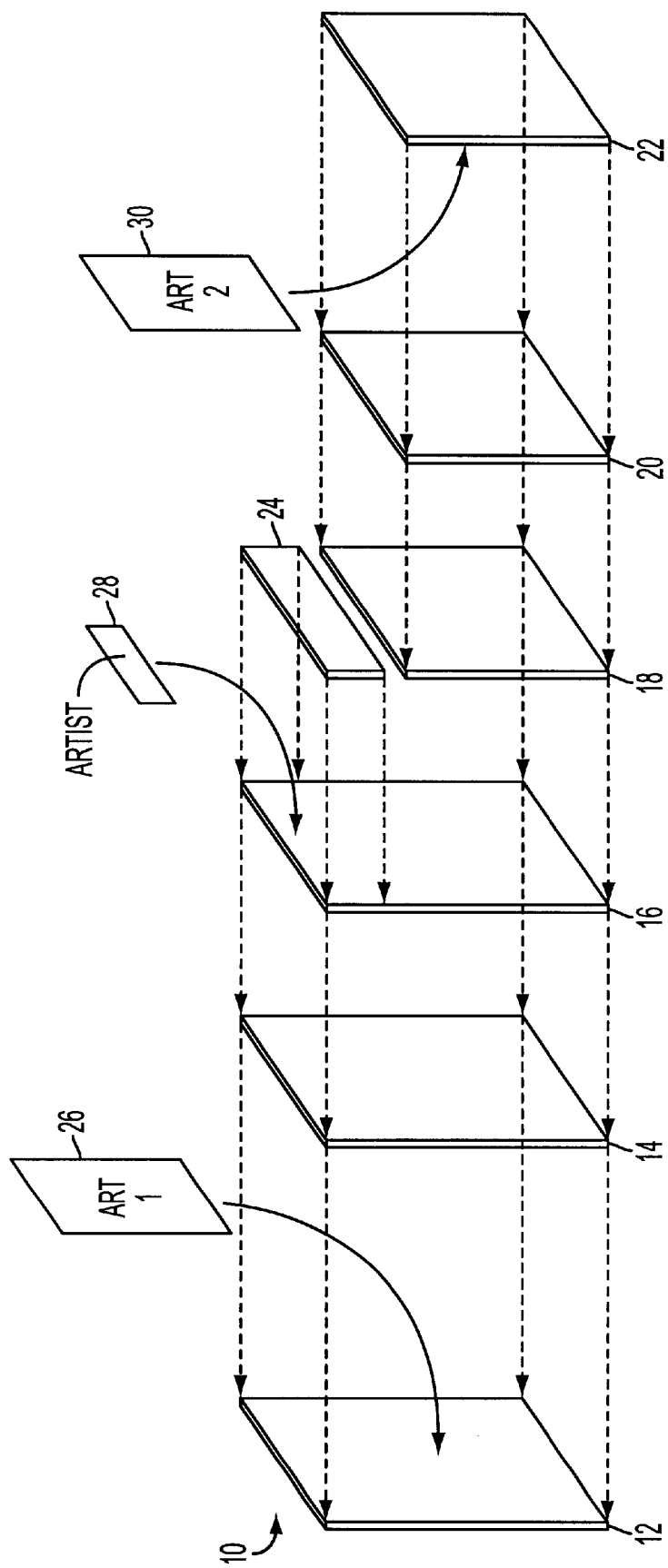
FIG. 1 illustrates a side perspective and expanded view of the disclosed holder with parts separated.

Referring now to FIG. 1, the disclosed holder 10 is shown unassembled in a side perspective and expanded view with parts separated. A plurality of layers 12–22 are stacked and bonded to form sheaths for holding labels and other printed materials. The layers 12–22 may be composed of plastic; for example, polyvinyl chloride (PVC)-based or polyurethane-based sheets may be used, with some or all of the sheets being transparent, colored, and/or opaque. Some or all of the layers 12–22 may also be composed of webbing including non-woven spunbonded olefin material such as "TYVEK" which is commercially available from "E.I. DU PONT DE NEMOURS AND COMPANY". The layers 12–22 may be bonded together by heat-sealing methods and/or by adhesives applied to the edges or peripheral portions of the contacting surfaces between the layers 12–22, such that substantially most of the surface area of the layers 12–22 is unbonded, forming a sheath bounded by the bonded portions.

In a preferred embodiment, the holder 10 has the layers 12–14 and 20–24 composed of transparent plastic, and the layers 16–18 are composed of "TYVEK", with the peripheral outer portions of each layer being heat-sealed to a neighboring layer, and forming a plurality of sheaths for positioning and storing a compact disk (CD) or other media and for positioning and storing printed material 26–30 therein. In the preferred embodiment, a heat seal is not formed between the upper edges of the layers 12–14, to form a first sheath for holding a first item 26 of printed material such as artwork and/or liner notes associated with the CD. Similarly, a heat seal is not formed between the upper edges of the layers 20–22, to form a second sheath for holding a second item 30 of printed material such as additional artwork and/or liner notes. Further, a heat seal is not formed between the lower edge of the layer 24 and the upper edges of the layers 18–20 with the non-peripheral portions of the layers 16 or any of the upper edges of the layer 18–20, thus forming at least one sheath for holding a CD between the "TYVEK" layers 16–18, and forming at least one sheath for holding the third item 28 of printed material.

The third item 28 is positioned in the sheath formed between the layers 16 and 24 to protrude above the CD when the holder 10 is placed, for example, in an upright collection of CD and holders. The third item 28 may be a label with indicia and/or user-customizable writing material for identifying the CD by artist name, by album title, by label number, by location of the holder, and by style such as musical genre.

The sheath formed between the layers 16–18 composed of "TYVEK" is adapted to protect the digital-data-bearing side of the CD facing the "TYVEK" from dust, from oil from the hands of a person reviewing the holder 10 and the CD stored therein, from impact with objects, from excessive friction, and from other causes of scratches and other data-corrupting effects.

In another embodiment, the layers 14–16 may be substantially bonded together, and similarly the layers 18–20 may be substantially bonded together, such that one side of the combination of layers 14–16 and 18–20, respectively, is a smooth surface for facilitating insertion of printed materials 26 and 30, while the other side of each of the respective combinations presents a surface composed of "TYVEK" for facing a CD between the layers 16–18.

Figure 2:
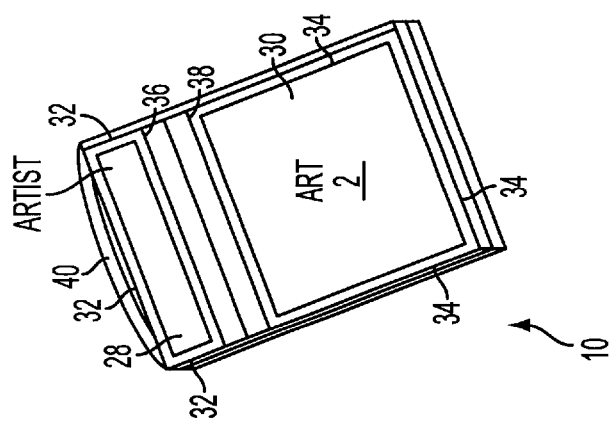
FIG. 2 illustrates a front side perspective view of the assembled holder.

FIG. 2 illustrates a front side perspective view of the assembled holder 10, in which heat seals 32–34 extend around the periphery of the holder 10, except as noted above to form openings 36–40 to the aforesaid sheaths for holding printed material such as the label 28 and the artwork 30 behind transparent plastic formed by the layers 24 and 22, respectively. The label 28 and the artwork 26 and 30 are removably disposed within the aforesaid sheaths between layers and accessible through the openings 36–40. The layers 12–22 may provide sufficient friction with the printed materials 26–30 so as to prevent such printed materials 26–30 from accidentally exiting the sheaths through the openings 36–40.

The sheath for the label 28 is positioned so as to extend vertically above the artwork 30. Thus, for multiple holders 10 horizontally stacked in a collection of CDs, the labels 28 protrude above the artwork 30, which facilitates perusal and searching of the CDs by a user, such as a customer of unsold CDs in a store, or an owner of a collection of CDs quickly looking for a particular CD.

Figure 3:
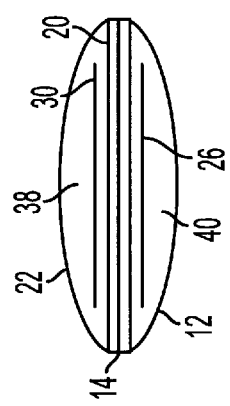
FIG. 3 illustrates a top plan view of the holder with layers opened to form sheaths.

FIG. 3 illustrates a top plan view of the holder with layers opened to form sheaths, in which the layer 12 is deformed away from the layer 14, thus forming the opening 40 in which the item 26 may be inserted or removed. Similarly, the layer 22 is deformed away from the layer 20, thus forming the opening 38 in which the item 30 may be inserted or removed.

Figure 4:
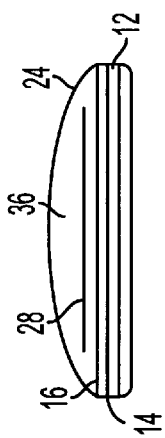
FIG. 4 illustrates a bottom plan view of the holder with at least one layer opened to form a sheath.

In addition, FIG. 4 illustrates a bottom plan view of the holder with at least one layer opened to form a sheath, in which the layer 24 is deformed away from the layer 16, thus forming the opening 36 in which the item 28 may be inserted or removed.

The layers 12–24 may be fabricated and dimensioned, for example, such that the overall length and/or width of the holder 10 is greater than, for example, about 5 inches (12.7 cm.), and so the openings 36–40 are wide and/or long enough to accommodate the items 26–30 having a diameter of over 5 inches (12.7 cm.). Accordingly, original artwork, labels, liner notes, and other printed materials may be readily inserted into and removed from the sheaths and the openings 36–40 thereto, without folding, bending, cutting, or other mutilation in order to fit the original printed materials accompanying the CD into the sheaths. Since CDs may include associated printed materials having dimensions greater than the dimensions of standard jewel boxes and jewel cases, the disclosed holder 10 is adapted and configured to store such printed materials without modification. In addition, since the layers 12 and 22–24 may be transparent, the original printed materials may be inserted behind such layers 12 and 22–24 without bending or cutting, and so the information on such printed materials such as artwork or words are preserved for display through the transparent layers 12 and 22–24.

The holder 10 may be assembled in the manner set forth above, in which a machine places different webbings into substantially adjacent configurations, and then heatsealing the appropriate edges. The heatsealed webbings may then be selectively cut to form the layers 12–24 with the heat-sealed layers 12–24 forming the finished holder 10. Such processing of webbings including plastics and "TYVEK" may be performed using the breather-bag fabrication system and method described in U.S. Pat. Nos. 5,536,356 and 5,571,361, which are incorporated herein by reference.

The holder 10 and method of use and construction have been disclosed by way of the preferred embodiment. However, numerous modifications and substitutions may be had without departing from the spirit of the invention. For example, while the preferred embodiment discusses holding CDs, other media such as computer floppy disks may be similarly held. In addition, while the foregoing discusses using transparent plastic, it is wholly within the purview of the invention to contemplate having particular layers such as the layers 12 and 22 formed with the artwork imprinted thereon, for example, including holograms, and thus forming the holder 10 in the manner as set forth above. Accordingly, the invention has been described by way of illustration rather than limitation.

What is claimed is:

1. A holder for compact disks, the holder comprising:
   a plurality of layers of material bonded together to form multiple sheaths, including:
      a first pair of layers composed of transparent material forming a first information sheath for retaining a first set of printed materials associated with the compact disk;
      a second pair of layers composed of transparent material forming a second information sheath for retaining a second set of printed materials associated with the compact disk;
      a third pair of layers composed of webbing forming a media sheath for holding a compact disk disposed therein, with the webbing for protecting the compact disk, wherein the third pair is positioned between the first and second pairs;
      wherein the first, second, and third layers are bonded together at peripheral portions thereof; and
   wherein the plurality of layers and the sheaths formed therebetween are dimensioned to retain the compact disk and associated printed materials in an original state without alteration in size of the associated printed materials.

2. The holder of claim 1, wherein the transparent materials include clear plastic.

3. The holder of claim 1, wherein the webbing includes a non-woven spunbonded olefin material.

4. The holder of claim 1, further comprising:
   a label layer composed of transparent material and bonded to a first webbing layer to form a third information sheath to retain a label therein, with the printed information on the label viewable through the label layer.

5. A holder for compact disks, the holder comprising:
   a plurality of layers of material bonded together to form multiple sheaths, including:
      a first pair of layers composed of transparent material forming a first information sheath for retaining a first set of printed materials associated with the compact disk;
      a second pair of layers composed of transparent material forming a second information sheath for retaining a second set of printed materials associated with the compact disk;
      a third pair of layers composed of webbing forming a media sheath for holding a compact disk disposed therein, with the webbing for protecting the compact disk, wherein the third pair is positioned between the first and second pairs;
      wherein the first, second, and third layers are bonded together at peripheral portions thereof; and
   wherein the plurality of layers and the sheaths formed therebetween are dimensioned to retain the compact disk and associated printed materials in an original state without alteration in size of the associated printed materials.

* * * * *